J. H. HALL.
MOTOR CONTROLLER.
APPLICATION FILED OCT. 16, 1912.
1,060,252.
Patented Apr. 29, 1913.
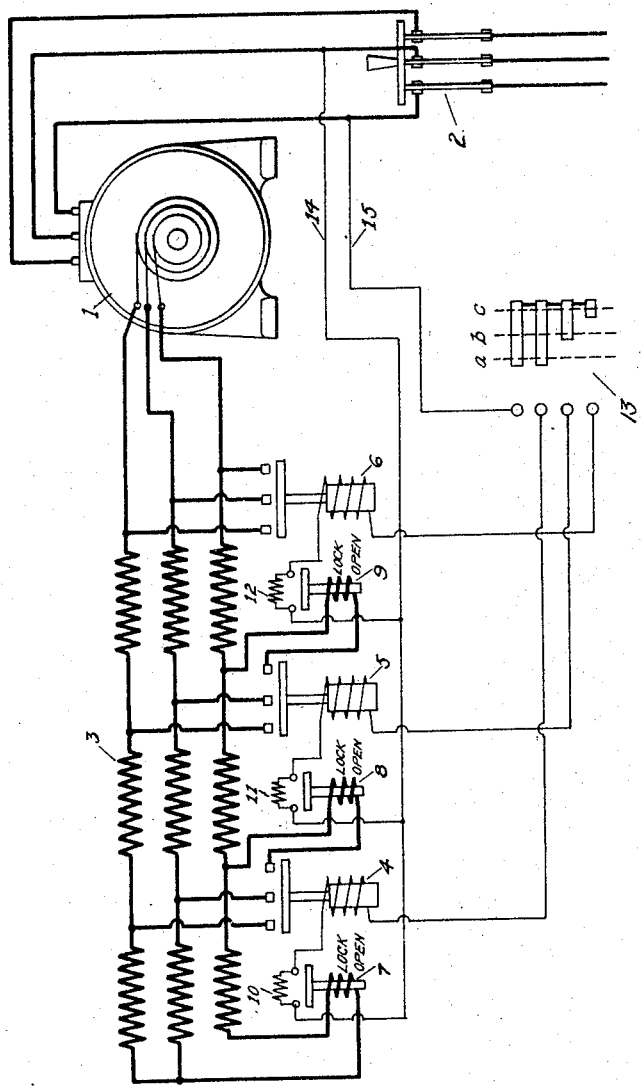
WITNESSES:
INVENTOR.
Jay H. Hall
BY F. N. Barber
ATTORNEY.

UNITED STATES PATENT OFFICE.

JAY H. HALL, OF CLEVELAND, OHIO, ASSIGNOR TO THE ELECTRIC CONTROLLER AND MANUFACTURING COMPANY, OF CLEVELAND, OHIO, A CORPORATION OF OHIO.

MOTOR-CONTROLLER.

1,060,252.  Specification of Letters Patent.  Patented Apr. 29, 1913.

Application filed October 16, 1912.  Serial No. 726,031.

*To all whom it may concern:*

Be it known that I, JAY H. HALL, a citizen of the United States, residing at Cleveland, in the county of Cuyahoga and State of Ohio, have invented new and useful Improvements in Motor-Controllers, of which the following is a specification.

My invention relates to controllers for electric motors, and it has for its object to provide a controller of this class that shall comprise separately-actuated switches for governing the acceleration of alternating-current motors.

My controller is particularly adapted to the control of slip-ring induction-motors, the acceleration of which is controlled by the cutting out of resistances connected in the secondary circuit of the motor.

In carrying out my invention, I employ a series of magnetically-operated resistance cut-out switches, each controlled by a relay whose winding is energized by current in the secondary circuit of the motor. The relays are arranged to have their windings connected in the circuit by the closure of the preceding resistance cut-out switch, which insures that the switches close in the proper sequence. Each relay in closing allows sufficient current to flow in the winding of the resistance cut-out switch with which it is associated to cause the closure of the switch.

Referring to the accompanying drawing, which shows diagrammatically a motor controller involving my invention, an induction-motor of the slip-ring type is shown at 1, having its primary windings adapted to be connected to a suitable source of supply by means of the switch 2. In the secondary circuit of the motor, a series of resistances 3 are connected, groups of which are arranged to be short-circuited by means of the resistance cut-out switches 4, 5, and 6. The closure of these switches is respectively controlled by the relays 7, 8, and 9, the windings of which are arranged to be connected in the secondary circuit of the motor. The windings of the resistance cut-out switches 4, 5, and 6 are supplied with current from the mains 14 and 15; and when the relay contacts are open, they are in series with these windings and the limiting resistances 10, 11, and 12. Current is supplied to the windings of the resistance cut-out switches through the contacts of an operator's switch 13, which may be moved to the positions *a*, *b*, and *c* for controlling the closure of the switches at will. Opposite each of the relays 7, 8, and 9, I place the legend "Lock open", to indicate that these relays are of the type disclosed in Eastwood's Patent, No. 1,040,292 which remain in their initial position, as shown, when current above a predetermined value, is established through their windings, and operate to close their contacts when the current is reduced to that value. The relays return to the position shown when the windings are deënergized. I have shown the leads 14 and 15 connected to the primary circuit of the motor, but it is obvious that current can be supplied to these leads from an independent source.

The operation of the controller is as follows: Upon the closure of the switch 2 the primary windings of the motor are excited, and the current in the secondary circuit is limited by the three sets of resistances 3. The winding of the relay 7, being connected in the secondary circuit of the motor, remains in its open position until the current in the winding decreases below a certain predetermined value, whereupon the relay closes its contacts and short-circuits the limiting resistance 10. If the operator's switch has been moved to the position *a*, the winding of the switch 4 will be energized to its full extent and close its contacts. If the operator's switch is moved to the position *a* prior to the closure of the relay 7, the current in the winding of the switch 4 will be limited by the resistance 10 and this switch prevented thereby from operating. Upon the closure of the relay 7, however, the resistance 10 is short-circuited, whereupon the switch 4 closes and short-circuits the first, or left-hand, group of the resistances in the secondary of the motor. The winding of the relay 7 is now short-circuited, and the relay drops to its open position, inserting the resistance 10 in the circuit of the winding of the switch 4, but the switch in closing has diminished the reluctance of its magnetic circuit and remains closed with the resistance 10 inserted in its circuit. The closure of the switch 4 also connects the winding of the relay 8 in the secondary circuit of the motor, but the increased current which flows due to the cutting out of the first group of the resistances locks open this relay and temporarily prevents the closure of the switch 5, even though the operator's switch has been moved to the position b.

When the current in the winding of the relay 8 decreases to a predetermined value (the switch 13 being at the position b), this relay closes its contacts, short-circuiting the limiting resistance 11, thereby increasing the current in the winding of the switch 5, and causing this switch to close. The winding of the relay 8 is thereupon short-circuited, allowing this relay to open and re-insert the resistance 11 in the circuit of the winding of the switch 5. At the same time the winding of the relay 9 is connected in the secondary circuit of the motor. The increased current in the secondary circuit, due to the cutting out of the second or middle group of the resistances by the switch 5, causes the relay 9 to be locked open until the current diminishes to a predetermined value, whereupon it will close its contacts, and short-circuit the resistance 12. Upon movement of the operator's switch to the position c, the switch 6 will close its contacts. The closure of the switch 6 cuts out the last, or right-hand, group of the resistances, thereby deënergizing the winding of the relay 9, causing it to open its contacts, and all the secondary windings of the motor are now short-circuited, whereupon the motor operates at its normal speed. It is seen that the closure of the resistance cut-out switches may be governed at will by the movement of the operator's switch, but that they cannot close too rapidly because of the protection afforded by the current limit relays 7, 8, and 9. To stop the motor, the switch 2 is opened, which disconnects the motor from the source of supply. The switches then closed open, because their windings are deënergized.

If speed-control at the will of the operator is not desired, the conductors leading to the operator's switch can be connected together or left as they are in the position c of the operator's switch. Upon the closure of the switch 2 the motor is brought up to speed as quickly as possible, the only delay in the closure of the resistance cut-out switches being that due to the locking open of their respective relays when the current in their windings is above a predetermined value.

I claim—

1. The combination of an induction motor, primary and secondary windings therefor, resistances in circuit with the secondary, a switch for short-circuiting the resistances, a relay for controlling the closure of said switch including a winding energized by current in the motor secondary, and means to prevent the closure of the switch whenever the relay winding is not energized.

2. In an induction motor controller, in combination, a series of switches for cutting out resistance in the circuit of the motor secondary, windings for the switches supplied with current independent of the current in the secondary, means for limiting the current in the windings, a relay associated with each switch comprising a winding connected in the secondary circuit by the closure of the preceding switch, and means controlling the limiting means for limiting the current in the switch winding whenever the relay winding is not energized and when the current in the relay winding exceeds a predetermined value.

3. In an induction motor controller, in combination, resistances in the secondary circuit of the motor, a series of separately-actuated switches for successively cutting out the resistances, operating windings for the switches adapted to be connected to the primary of the motor, a limiting resistance for each winding, relay contacts for short-circuiting each limiting resistance, and a winding for the contacts except the contacts of the first relay connected in the secondary by the closure of the preceding switch of the series, the said contacts remaining unconnected by the relay when the winding is deënergized and when the current in the winding exceeds a predetermined value.

4. In an induction motor controller, in combination, resistances in the secondary circuit of the motor, a series of separately-actuated switches for cutting out the resistances, operating windings for the switches connected to the primary of the motor, a limiting resistance in series with each winding, and a relay for controlling each of the limiting resistances, comprising a winding connected in the secondary by the closure of the preceding switch, and contacts closed by current in the winding to short-circuit the limiting resistance with which they are associated, the said contacts remaining open whenever the relay winding is not energized.

5. In a motor-control system, an induction motor, a primary and secondary circuit for the motor, resistances in the secondary circuit, a plurality of successively-operated switches for controlling the resistances, a relay with contacts normally unconnected thereby for controlling each switch, means for energizing the winding of the relays with current from the secondary circuit of the motor upon the closure of a switch which precedes in operation, and means for deënergizing the relay-winding upon the closure of the switch controlled by the relay.

6. In a motor-control system, an induction motor, primary and secondary circuits therefor, resistances in the secondary circuit, magnetically-operated switches for controlling the resistances, a relay for controlling the closure of each switch, and means acting upon the closure of each switch to cause the contacts of its own relay to be disconnected.

7. In a motor-control system, an induction motor, a primary and secondary circuit for the motor, resistances in the secondary circuit, a plurality of successively-operated switches for controlling the resistances, a relay with contacts, normally unconnected thereby, for controlling each switch, and means for energizing the winding of the relays with current from the secondary circuit of the motor upon the closure of a switch which precedes in operation.

Signed at Cleveland, Ohio, this 14th day of October, A. D., 1912.

JAY H. HALL.

Witnesses:
R. H. BENNETT,
W. M. DIEMER.